United States Patent
De Peuter et al.

(10) Patent No.: US 8,051,164 B2
(45) Date of Patent: *Nov. 1, 2011

(54) IMPACT PROPAGATION IN A DIRECTED ACYCLIC GRAPH HAVING RESTRICTED VIEWS

(75) Inventors: Geert De Peuter, Turnhout (BE); David Bonnell, Reading (GB)

(73) Assignee: BMC Software, Inc., Houston, TX (US)

( * ) Notice: Subject to any disclaimer, the term of this patent is extended or adjusted under 35 U.S.C. 154(b) by 751 days.

This patent is subject to a terminal disclaimer.

(21) Appl. No.: 11/956,522

(22) Filed: Dec. 14, 2007

(65) Prior Publication Data

US 2009/0157724 A1  Jun. 18, 2009

(51) Int. Cl.
  *G06F 15/16* (2006.01)
(52) U.S. Cl. .................. 709/224; 709/225
(58) Field of Classification Search .......... 709/224
  See application file for complete search history.

(56) References Cited

U.S. PATENT DOCUMENTS

| | | | | |
|---|---|---|---|---|
| 6,041,049 A * | 3/2000 | Brady | | 370/351 |
| 6,249,755 B1 * | 6/2001 | Yemini et al. | | 702/183 |
| 6,738,893 B1 * | 5/2004 | Rozas | | 712/24 |
| 6,765,863 B1 * | 7/2004 | Wakimoto et al. | | 370/218 |
| 6,983,321 B2 * | 1/2006 | Trinon et al. | | 709/224 |
| 7,424,530 B2 * | 9/2008 | Chagoly et al. | | 709/224 |
| 7,580,813 B2 * | 8/2009 | Thiesson et al. | | 703/2 |
| 2002/0184568 A1 * | 12/2002 | Kurrasch | | 714/39 |
| 2003/0012145 A1 * | 1/2003 | Bragg | | 370/254 |
| 2003/0220860 A1 * | 11/2003 | Heytens et al. | | 705/35 |
| 2004/0015929 A1 * | 1/2004 | Lewis et al. | | 717/156 |
| 2004/0046785 A1 * | 3/2004 | Keller | | 345/734 |
| 2004/0049372 A1 * | 3/2004 | Keller | | 703/22 |
| 2005/0021742 A1 * | 1/2005 | Yemini et al. | | 709/224 |
| 2005/0049988 A1 * | 3/2005 | Dahlquist et al. | | 706/46 |
| 2006/0010337 A1 * | 1/2006 | Suzuki | | 714/4 |
| 2006/0059027 A1 * | 3/2006 | Berenbach et al. | | 705/7 |
| 2006/0161466 A1 * | 7/2006 | Trinon et al. | | 705/7 |
| 2006/0239211 A1 * | 10/2006 | Previdi | | 370/256 |
| 2007/0140245 A1 * | 6/2007 | Anjum et al. | | 370/390 |
| 2008/0240129 A1 * | 10/2008 | Elmeleegy et al. | | 370/401 |
| 2008/0298276 A1 * | 12/2008 | Chen et al. | | 370/255 |
| 2009/0157723 A1 * | 6/2009 | De Peuter et al. | | 707/102 |
| 2009/0292720 A1 * | 11/2009 | De Peuter et al. | | 707/102 |
| 2010/0142409 A1 * | 6/2010 | Fallon et al. | | 370/255 |
| 2010/0161532 A1 * | 6/2010 | Becker | | 706/26 |

* cited by examiner

*Primary Examiner* — Bunjob Jaroenchonwanit

(57) ABSTRACT

Service impact data is efficiently propagated in a directed acyclic graph with restricted views. One or more service components, impact rules and business rules are grouped together into a directed acyclic graph and a related metadata array. Impact propagation uses related metadata array to minimize traversal of the graph. As nodes of the graph are updated to propagate impact data, a determination is made as to when no further impact propagation is required. Subsequently, calculations are terminated without having to traverse the entire graph. This method allows a system or business administrator to view and receive real-time notification of the impacted state of all nodes in the graph that are available to their permitted view. Restricted views ensure that available service impact data is only displayed to end users having the proper authorization to view the underlying impact model data.

20 Claims, 12 Drawing Sheets

```
if ( oldGlobalStatus != oldViewStatus )
{
    // undo previously applied view status change
    decrementParentsViewStatus( oldViewStatus );
    incrementParentsViewStatus( oldGlobalStatus );
} if ( newGlobalStatus != newViewStatus )
{
    // apply new view status changes
    decrementParentsViewStatus( newGlobalStatus );
    incrementParentsViewStatus( newViewStatus );
}
```

*FIG. 5B*

| W | G | VI |
|---|---|---|
| A | −1 | −1 |
|   | −1 | 0 |
|   | WN | OK |

IMPACT PROPAGATION IN A DIRECTED ACYCLIC GRAPH HAVING RESTRICTED VIEWS

CROSS-REFERENCE TO RELATED APPLICATIONS

This application is filed concurrently with U.S. patent application Ser. No. 11/956,507, entitled "Impact Propagation in a Directed Acyclic Graph," having inventors Geert De Peuter and David Bonnell, which is incorporated herein by reference in its entirety.

BACKGROUND

Impact calculation and propagation in a graph is normally a very resource intensive and computing expensive process, typically requiring recursive traversal of large impact models. For example, an impact model having hundreds of thousands of nodes are not uncommon for an enterprise computing environment. The nature of system or service monitoring requires that multiple impacting events (e.g., computer offline or sub-network outage) will have to be processed at the same time or in close proximity to each other. Furthermore, such close processing of events often results in overlapping impact sets (the set of graph nodes impacted by a given event). Consequently, traditional impact propagation techniques often require redundant graph traversal and impact calculations to be performed.

In an enterprise computing environment, some end users in one domain may not have access to certain information about service components in another domain, due to security reasons, privileges, etc. As is common, an enterprise computing environment can have multiple domains and end users with various restrictions and privileges. Due to complexity, segregating restricted information from a service impact model and restricting access to the information can be difficult to track and handle.

SUMMARY

Service impacts are efficiently propagated in a data structure representing a service impact model. The data structure is a directed acyclic graph with restricted views. One or more service components, impact rules, and business rules are grouped together into the directed acyclic graph and related metadata array. Impact propagation uses related metadata array to minimize traversal of the graph. As nodes of the graph are updated to propagate impact data, a determination is made as to when no further impact propagation is required. Subsequently, calculations are terminated without having to traverse the entire graph. This method improves performance and scalability of a real-time impact propagation system using large, complex service models, allowing a system or business administrator to view and receive real-time notification of impacted states of all nodes in the graph that are available to their permitted view. Restricted views ensure that available service impact data is only displayed to end users having proper authorization to view underlying impact model data.

BRIEF DESCRIPTION OF THE DRAWINGS

FIG. 5A shows an example state table for a node.

FIG. 5B illustrates an algorithm for view specific reference count updates.

DETAILED DESCRIPTION

Figure 1:
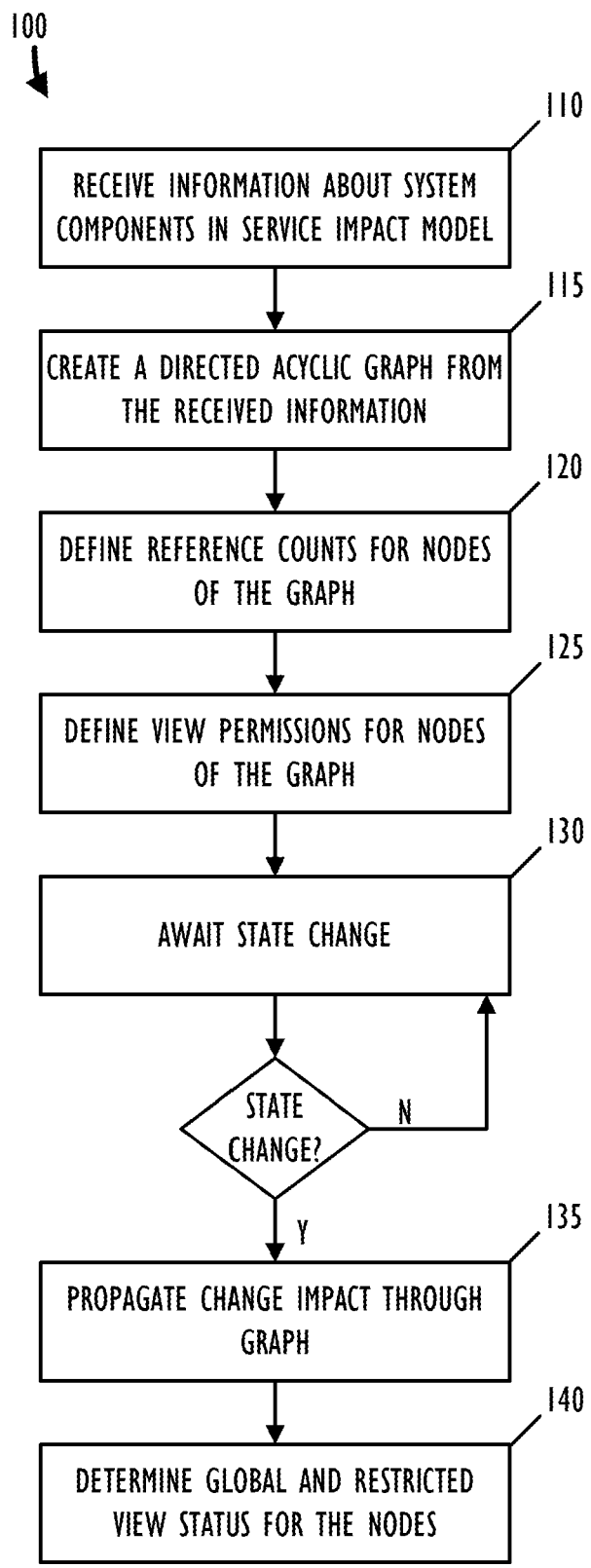
FIG. 1 illustrates a propagation process according to the present disclosure.
Figure 2:
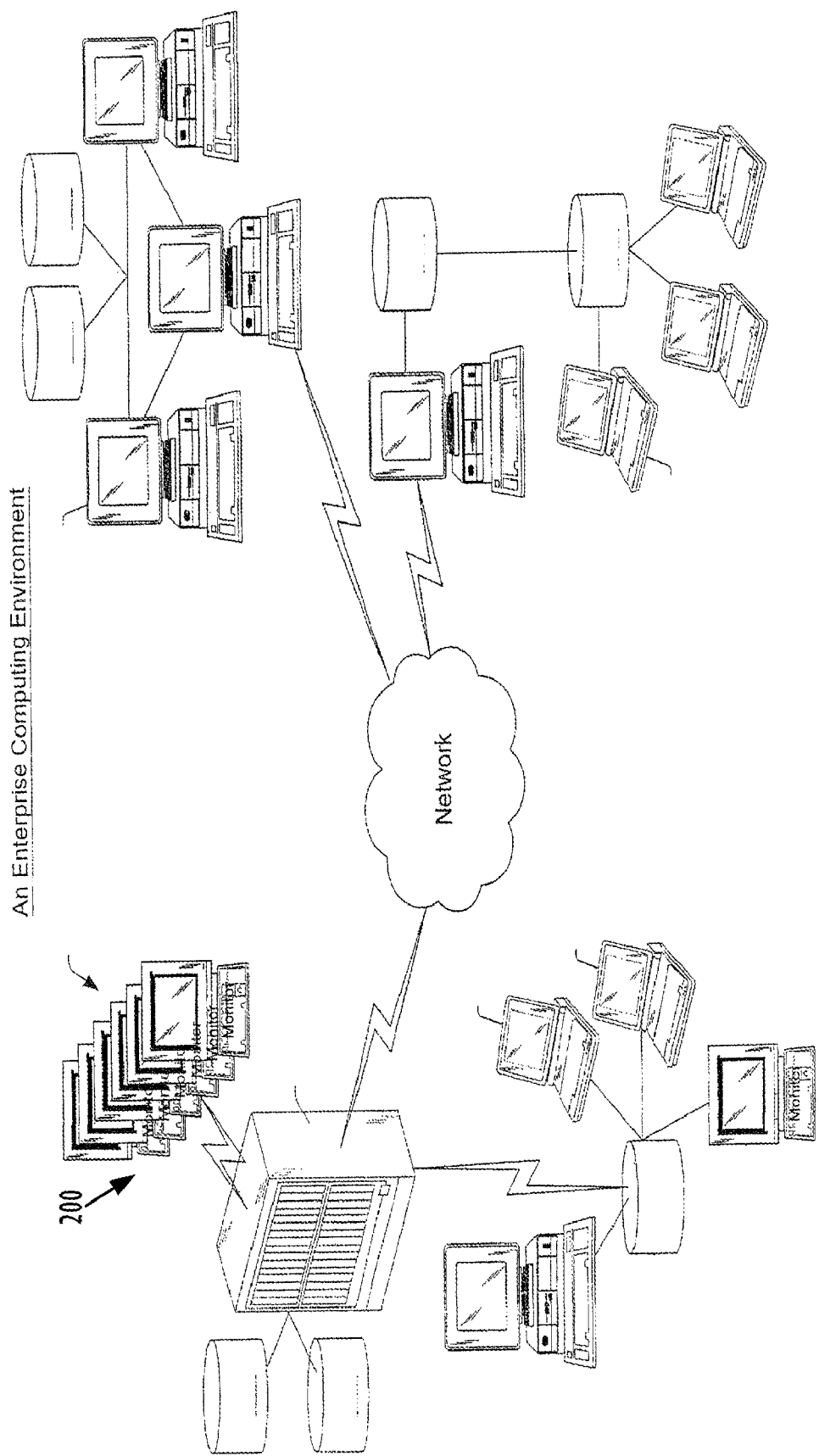
FIG. 2 illustrates an example enterprise computing environment on which the process of FIG. 1 can be implemented.

FIG. 1 shows a propagation process 100 according to the present disclosure. An example computing environment 200 on which the propagation process 100 can be executed is shown in FIG. 2. In general, computing environment 200, such as an enterprise computing environment, has various system components, such as computers, servers, routers, storage devices, databases, etc. One or more components can execute systems management software that receives information about other components in computing environment 200 to create a service impact model. The service impact model is a directed acyclic graph containing service components. The directed association between service components in the graph defines an impact relationship between service components. Service components may represent system components or any logical or physical resource, function, process or service necessary for efficient business operation. A service component may also be referred to simply as a component.

Depending on viewing restrictions or privileges to system management information, some information about other components in environment 200 may not be accessible to actual end users using that software. For example, an end user in the marketing domain of the computing environment 200 may not have access to system components and related information for the finance domain of environment 200. In essence, end users in the marketing domain would have a restricted view of environment 200 that excludes viewing information about components in the finance domain, such as their states, status, throughput, or other operational information. However, an end user in the management domain may have access to all other domains in the enterprise, thereby having a global view.

To handle such restrictions, propagation process 100 of FIG. 1 tracks states of service components based on various views available to system end users, which can be organized as individuals, groups of users, domains within an enterprise, or the like. Each of the various views defines what information the end user operating within a restricted view can access. Moreover, given that some information about service components will not be accessible to a restricted end user, each of the various views also dictate what resultant state of various service components will be presented to end users of that view.

Initially, process 100 executing on systems management software receives information about service components of FIG. 2 (Block 110). Received information can include information about service component type, id, state, relationships with other service components, cost, responsible person, owner, service level agreements, operating hours, etc. From received information, process 100 creates a data structure (e.g., a directed acyclic graph such as in FIG. 3A) (Block 115).

In context of system service management, graph 205 can represent a service impact model for computing environment 200 of FIG. 2. As a service impact model, this directed acyclic graph 205 has nodes 210 representing service components and has directed edges 212 (arrows) representing an impact relationship between at least some of the components. For illustrative purposes, graph 205 has eleven nodes 210 (e.g., nodes N1, N2, N3, etc.). Using graph 205, support staff (e.g. system administrators) can manage the entire range of service level agreement (SLA) processes.

Because graph 205 is a directed graph with no directed cycles, no directed path exists for any given node 210 in graph 205 that both starts and ends at that node. Such a directed acyclic graph 205 can be considered as a generalization of a tree in which certain sub-trees can be shared by different parts of the tree. Each node 210 of graph 205 represents a particular business or information technology component, and directed edges 212 (arrows) represent an impact relationship between those two components. Node 210 from which edge 212 flows is often called the child, while node 210 to which edge 212 flows is referred to as the parent. A node 210 which has no child nodes is referred to as a leaf node. For reference, Depth table below identifies depth from root node N1 for each of the other ten nodes.

| Depth Table | |
|---|---|
| Depth | Node |
| 0 | N1 |
| 1 | N2 |
| 2 | N3 |
| 2 | N21 |
| 3 | N4 |
| 4 | N5 |
| 4 | N41 |
| 5 | L6 |
| 5 | L42 |
| 5 | N22 |
| 6 | L23 |

In context of system service management, some of the system end users may be restricted from viewing information about some service components and would therefore have a restricted view of the service impact model. Therefore, some nodes of the graph 205 may be restricted in different views of information in graph 205. On the other hand, some system end users may not be restricted from viewing any information about service components and would therefore have a global view of the service impact model. To handle different viewing privileges, process 100 of FIG. 1 uses reference counts to track viewing restrictions of nodes and corresponding states of those nodes under the particular viewing restrictions.

Accordingly, process 100 of FIG. 1 defines reference counts for non-leaf nodes 210 (i.e., nodes N1, N2, . . . etc. other than L6, L23, and L42 that have no children) (Block 120). Each reference count has a number of entries at least equal to a number of tracked states for corresponding nodes. In addition, process 100 defines at least one view indicator for each node (Block 125). Each view indicator indicates whether a given node is restricted in a corresponding view.

Figure 3A:
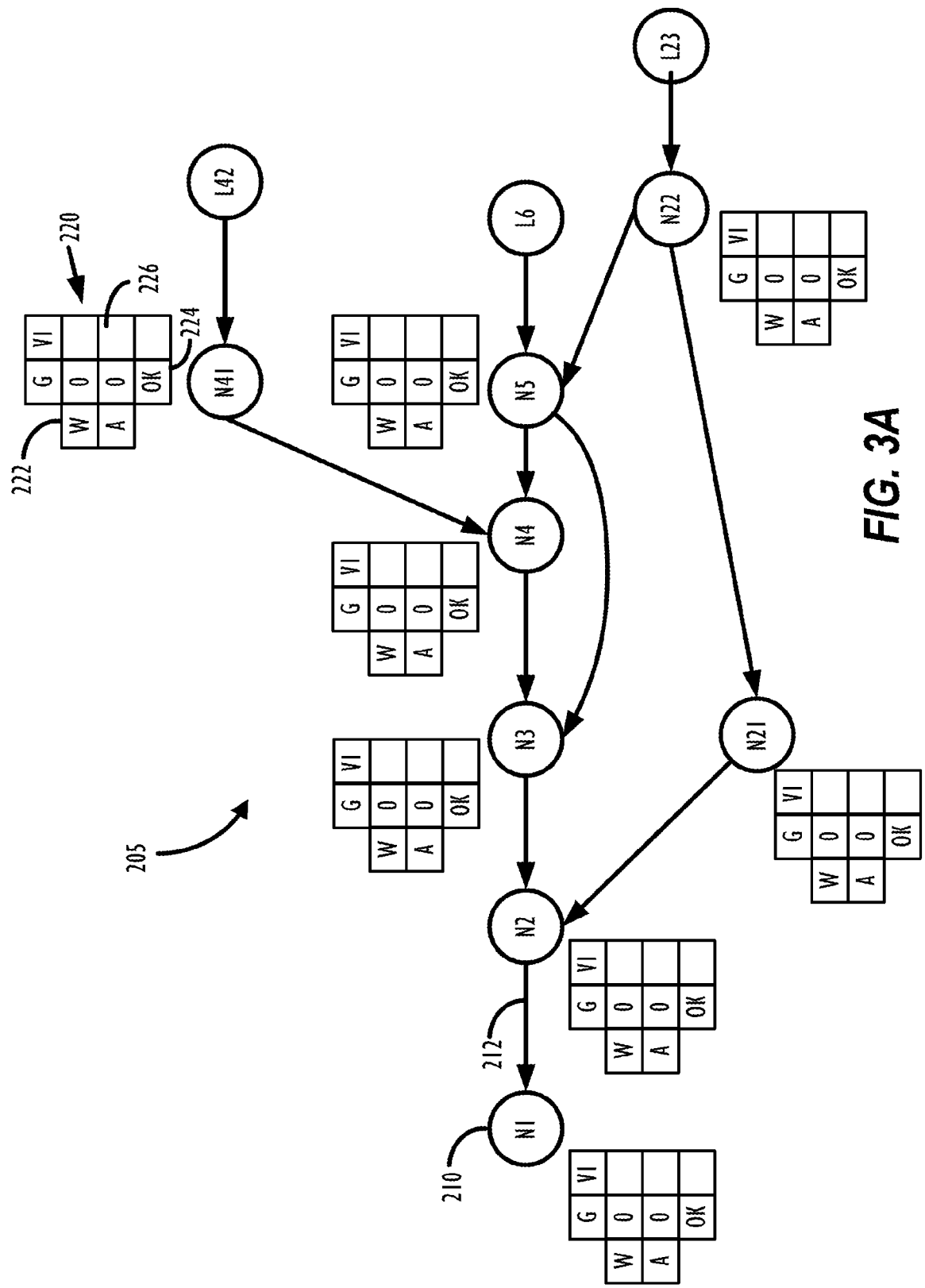
FIG. 3A illustrates a directed acyclic graph in its initial state.

In FIG. 3A, for example, each non-leaf node 210 in graph 205 has a reference count table 220. A state column 222 in table 220 identifies the number of states for which a reference count is maintained. In this particular example, the reference count is maintained for two tracked states (i.e., WARNING "W" and ALARM "A"). Tracking state of OK is not strictly necessary because it would be a default state if a given node 210 is not in either one of the two tracked states.

In table 220, a first view column 224 shows reference counts and view specific state of a global view "G" of graph 205. As used herein, a global view has no restricted nodes 210 so that all the nodes are visible in the global view. A second view column 226 in table 220 similarly tracks reference counts and view specific state of a particular restricted view "V1" in which certain nodes are restricted and, hence, not visible to a particular end-user. For simplicity, examples used in this disclosure for view specific impact propagation refer to a global view and a single restricted view. However, it will be appreciated that disclosed techniques are applicable to any number of view definitions. Moreover, even though FIG. 3A shows reference count tables 220 with two view columns 224 and 226, these columns do not have to be statically allocated, and any number of columns could be allocated (one required for each independent view restriction).

Whenever a state change occurs in the service impact model (Blocks 130), process 100 of FIG. 1 calculates state changes to nodes 210 in graph 205 by propagating a change impact along all directed edges 212 on each of nodes 210 dependent on or impacted by the state change (Block 135). Details for propagating change impact without restricted views are provided in co-pending U.S. patent application No. 11/956,507, which has been filed concurrently herewith and incorporated herein by reference. For present purposes, when state of a given node 210 changes, that change must be propagated along all directed edges 212 proceeding from given node 210 so that the impact of that change can be calculated on all other nodes 210 in the service model that depend on that given node 210 either directly or indirectly. This process is called impact propagation.

After propagating the change throughout graph 205, process 100 of FIG. 1 then determines a global state and at least one view state for each of nodes 210 based on defined view restrictions (Block 140). This determination then allows for operations of one or more services associated with the service impact model to be analyzed. Global view G is the entire directed acyclic graph. In examples below, the global view is designated as view G. When looking at the directed acyclic graph through global view G, every node will be visible. Consequently, the view shown in 205 can be considered as a global view of the directed acyclic graph.

When a node 210 is restricted in a restricted view (e.g., V1), then information about that restricted node 210 will not be visible to any end user who is restricted to view V11 to observe the impact graph 205 of FIG. 3A. Therefore, each node 210 in graph 205 may have multiple view-dependent states. To illustrate this point, consider a simple impact sub-graph in which node N21 and N3 both impact node N2 of graph 205 and where node N21 has state OK and node N3 has state ALARM. Impact propagation would normally also set node N2 to ALARM. If node N3 is restricted to a given view V1 so that node N3 does not appear in the view V1 of impact graph 205, then state of node N2 in view V1 should be OK. This is because node N3 is obscured or masked from view V1 and because node N2's only child in view V1 is node N21, which has state OK.

Further details of how state propagation occurs within restricted views of a directed acyclic graph such as in FIGS. 3A-3C according to the process of FIG. 1 are discussed below with reference to several examples.

Illustrative Example of State Propagation

Figure 3B:
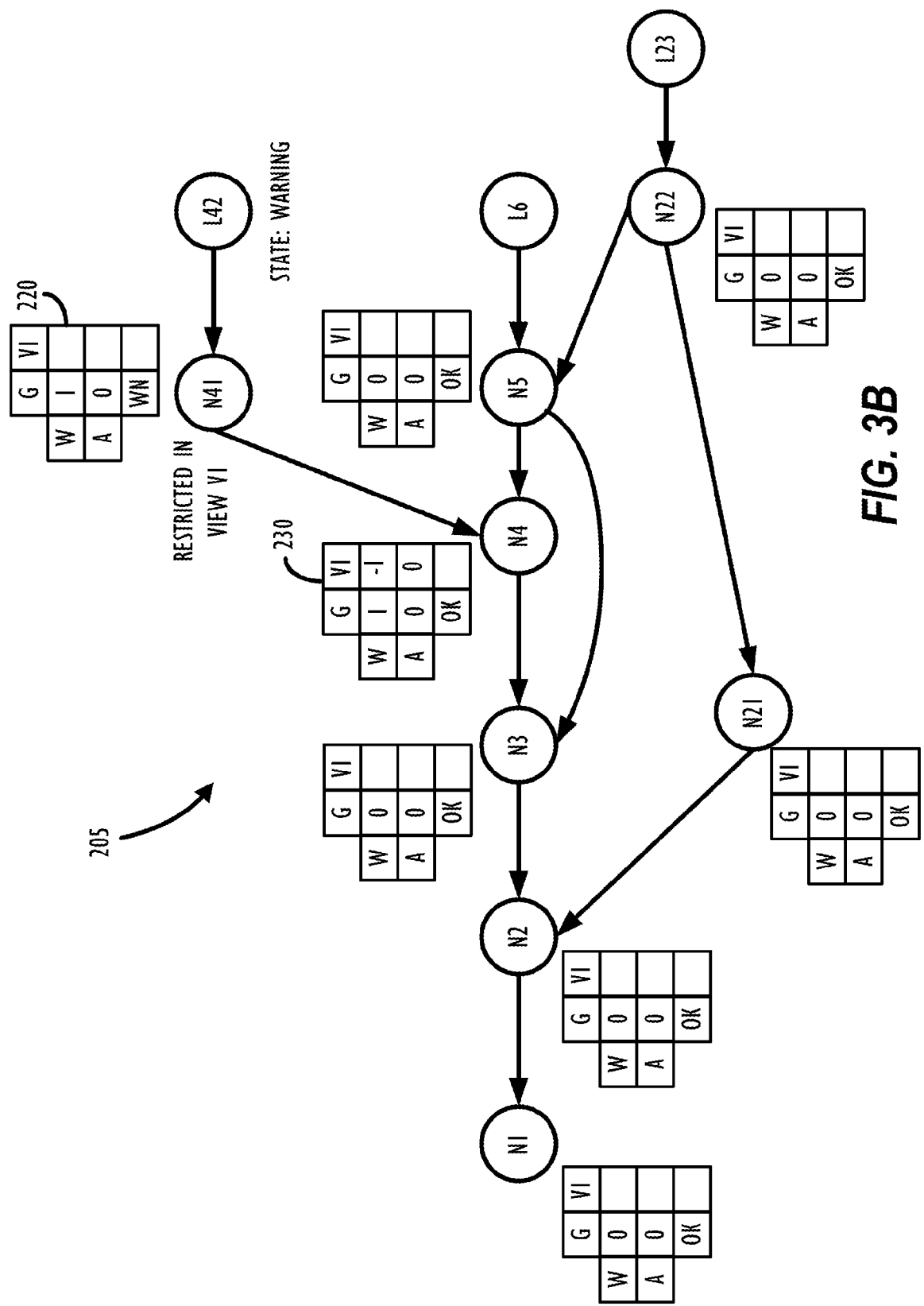
FIG. 3B illustrates the directed acyclic graph of FIG. 3A with the reference and view counters updated after a partial propagation of a state change with a restricted view.
Figure 3C:
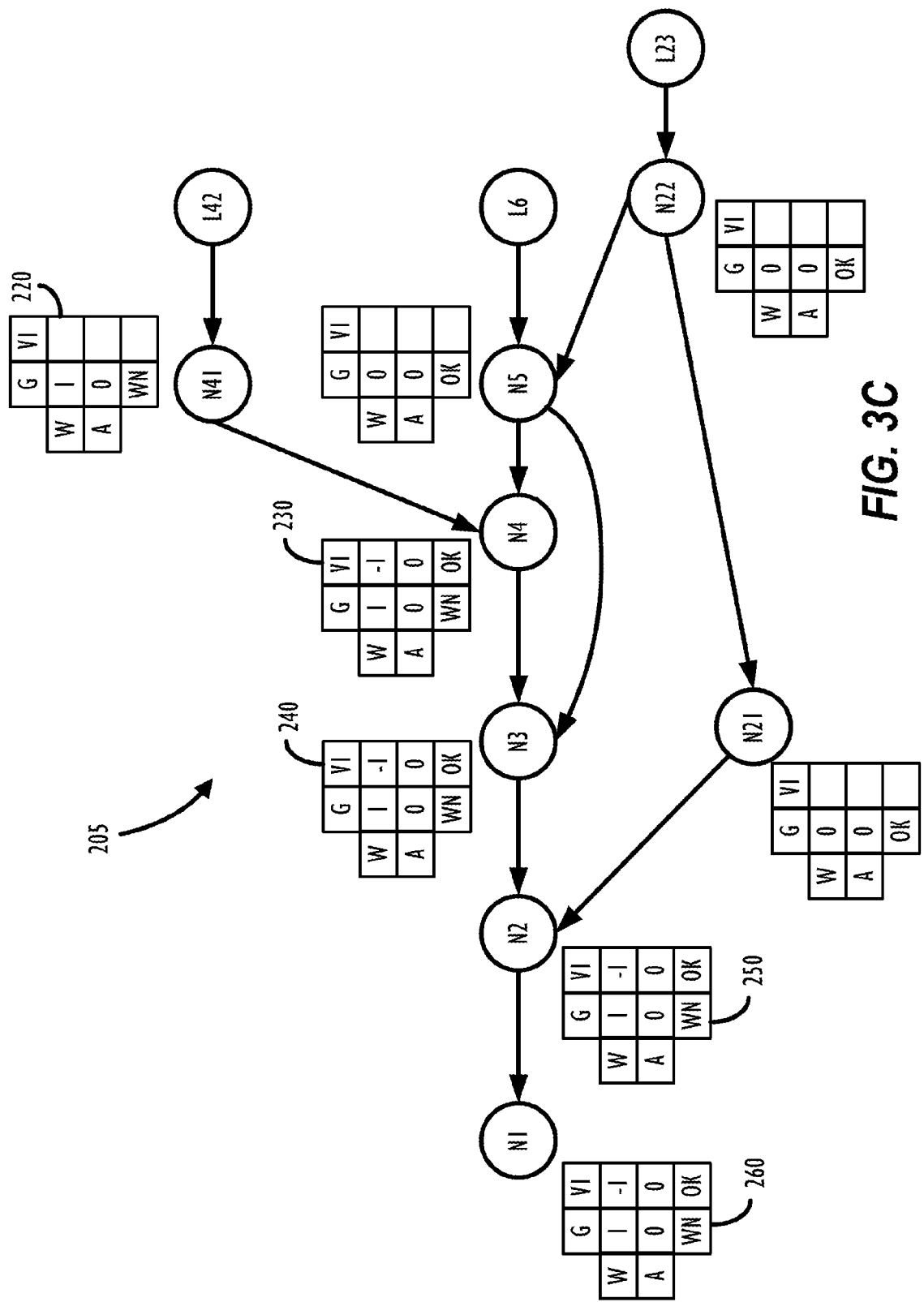
FIG. 3C illustrates the directed acyclic graph of FIG. 3A with the reference and view counters updated after complete propagation of the state change with the restricted view.

Referring to FIGS. 3A-3C, a first example of how state propagation in the directed acyclic graph 205 of a service impact model will be discussed. In this first example, a restricted view V1 is defined on node N41. In other words, end users such as system administrators who are only given permission to access view V1 will not be able to see any information pertaining to node N41 or any of its children (e.g., L42). Not only will end users not be able to view information directly about nodes N41 and L42, but end users will not be able to view the state of these nodes as propagated through the directed acyclic graph 205. In the example, leaf node L42 has WARNING state. Because leaf node L42 will be "hidden" in view V1 available to restricted node N41, node N1 in view V1 available to node N41 would still be OK state, while the state in global view G would be WARNING.

Input for calculating state propagation is a list of objects with their new state. In this example, operation is as follows: set_state(L42, "WARNING". This will result in a work list with the following task list on depth 5 of FIG. 2:

depth 5: L42→set_state("WARNING".

Just as with normal impact propagation, tasks on a task list can be processed in parallel, while task lists in a work list must be processed sequentially in descending order of depth.

When the task list on depth 5 is executed, state of leaf node L42 is changed from OK to WARNING, global WARNING count on node N41 is incremented as shown in its table 220, and a refresh task for node N41 is queued. After this task list is completed, it is removed from the work list, and the work list will be as follows:

depth 4: N41→refresh

The first step of the refresh task of node N41 is to calculate states in global view G based on current values of global state counters in table 220. Because reference count of WARNING is one, state of node N41 changes from OK to WARNING as shown in table 220, and global WARNING reference count of N41's parent node N4 is incremented as shown in its table 230.

The second step of the refresh task of node N41 is to calculate any restricted view states. Because node N41 is restricted within view V1, each state for restricted view V1 must be calculated as an offset or delta from the change made to global view G and applied to N41's parent node N4. Essentially, any changes that the refresh made to global reference counters in global view G of parent node N4 has to be reversed out in restricted view V1 for node N4 so that the change in global view G is masked or hidden from restricted view V1. In this case, WARNING reference count of parent node N4 was previously incremented. Therefore, WARNING reference count for view V1 of node N4 has to be decremented to negate the global counter change. This is shown by "−1" in view V1 column of node N4's table 230. The current state of the graph at this point in state propagation is reflected in FIG. 3B.

Continuing with the example, the final step of the refresh of node N41 is to queue a refresh of each parent node to which node N41 made reference counter changes. Thus, a refresh task of node N4 is queued on the task list for depth 3 of FIG. 2. The work list is now as follows:

depth 3: N4→refresh

Node N4 will first calculate global view state G. This triggers a state change from OK to WARNING so that node N4 increments global WARNING reference count in table 240 of its parent node N3 as reflected in FIG. 3C. Node N4 now calculates state in view V1 in its reference table 230. Because the sum of WARNING reference counts for global view G and restricted view V1 is 0 as is the sum of the ALARM reference counts in its reference table 230, state of node N4 in restricted view V1 is therefore OK.

Because global state changed and it is different from the state in restricted view V1, node N4 needs to negate the global counter change it made to its parent node N3. Therefore, WARNING reference count for node N3 must be decremented as shown in its reference table 240. Because node N4 caused changes on its parent node N3, a refresh of node N3 will be pushed on the task list for depth 2 of FIG. 2. These refreshing and negating steps continue up through depths of the task lists until the work list has been completed and all task lists have been executed. Therefore, parent nodes N2 and N1 go though a similar process, resulting in updated state changes reflected in their reference tables 250 and 260 in FIG. 3C.

Using this technique, state propagation can be accomplished with a single pass through the directed acyclic graph 205. In addition, view states and reference counters only need to be allocated as required and not continuously maintained for all nodes of the directed acyclic graph 205. Propagation may also be terminated when states of the global view G and all restricted views V1 are identical, saving both time and space.

Illustrative Example of Clearing a State

Figure 4A:
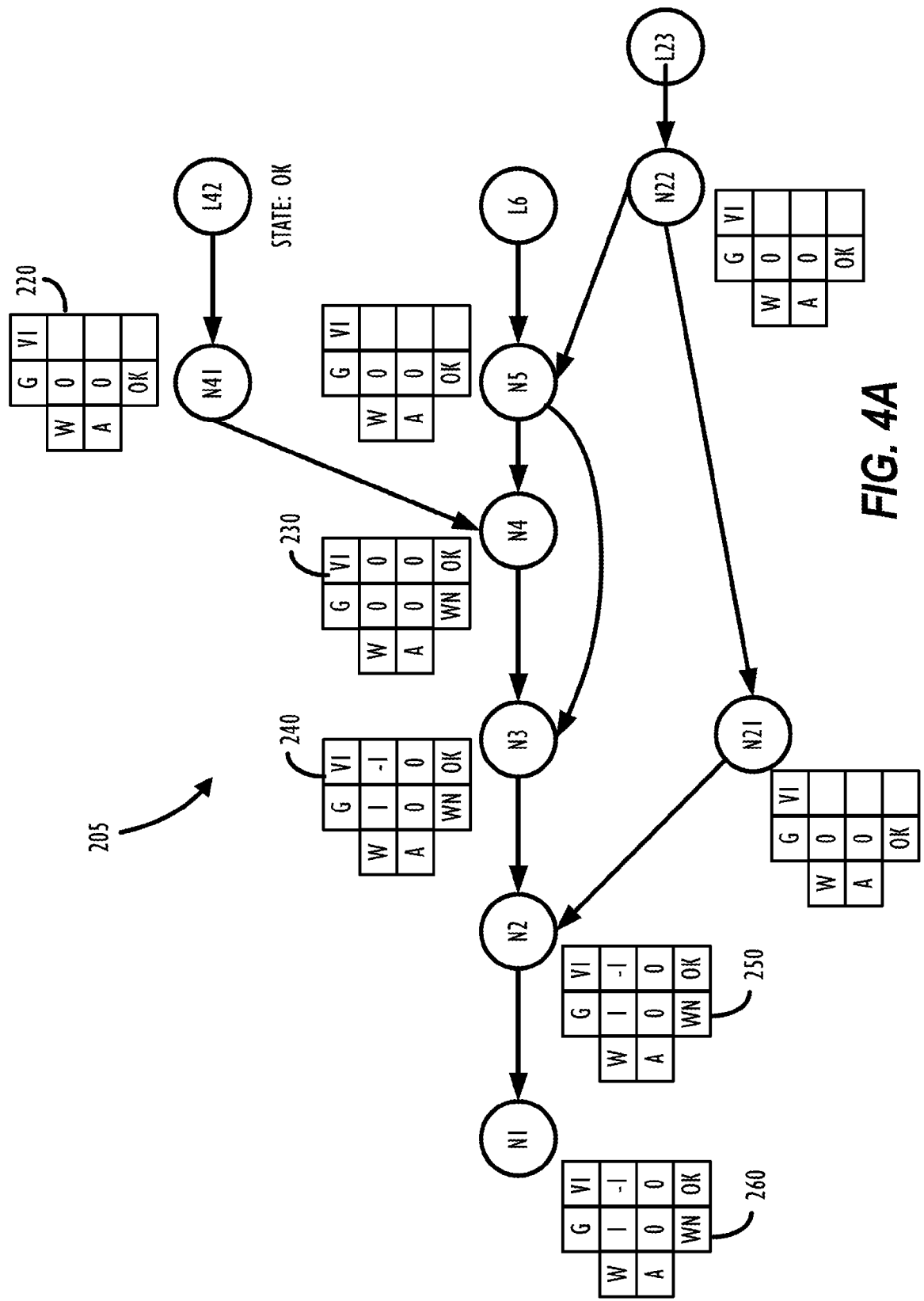
FIGS. 4A-4C illustrate the directed acyclic graph of FIG. 3A during stages of clearing a warning state for a restricted view.
Figure 4B:
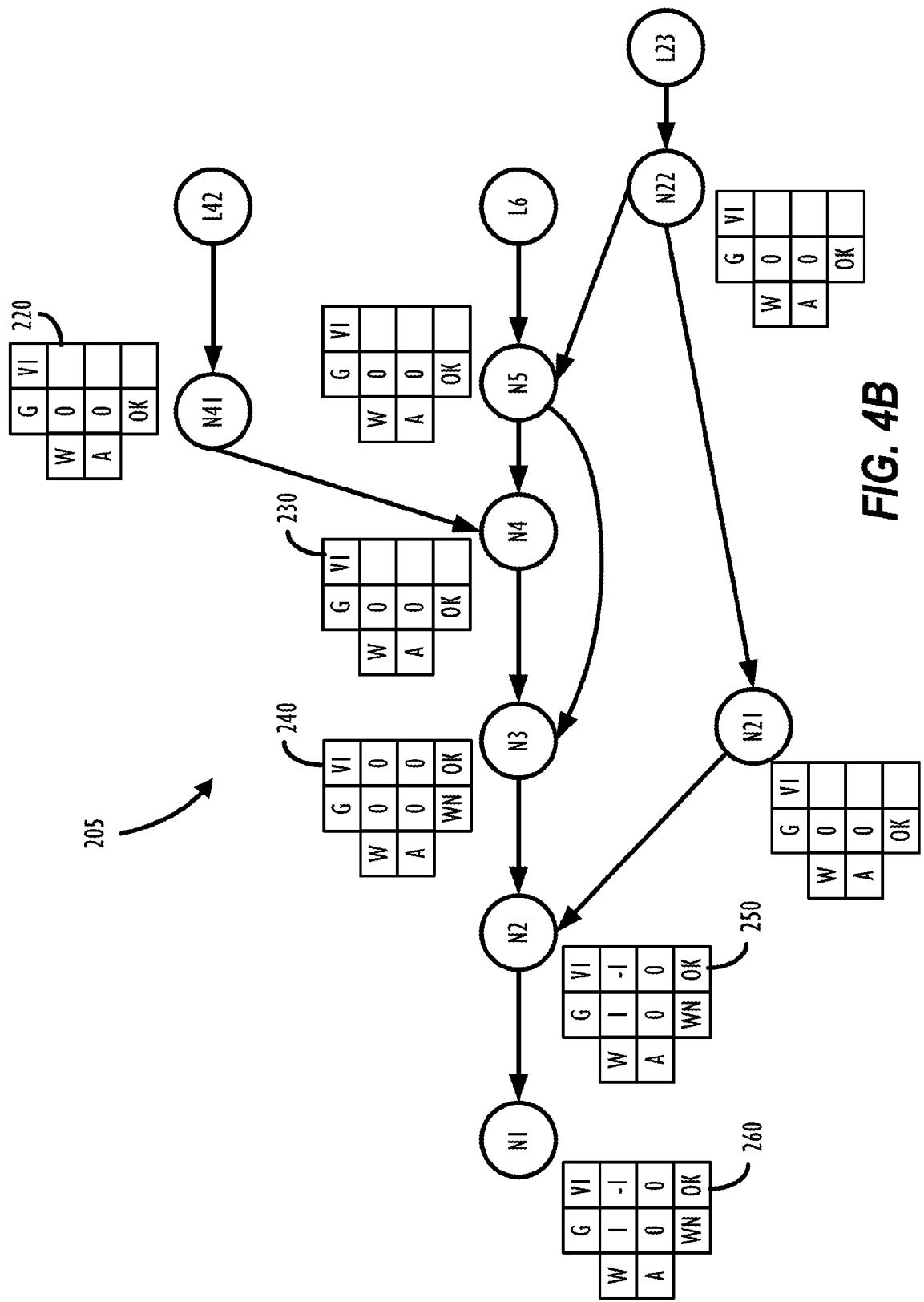
Figure 4C:
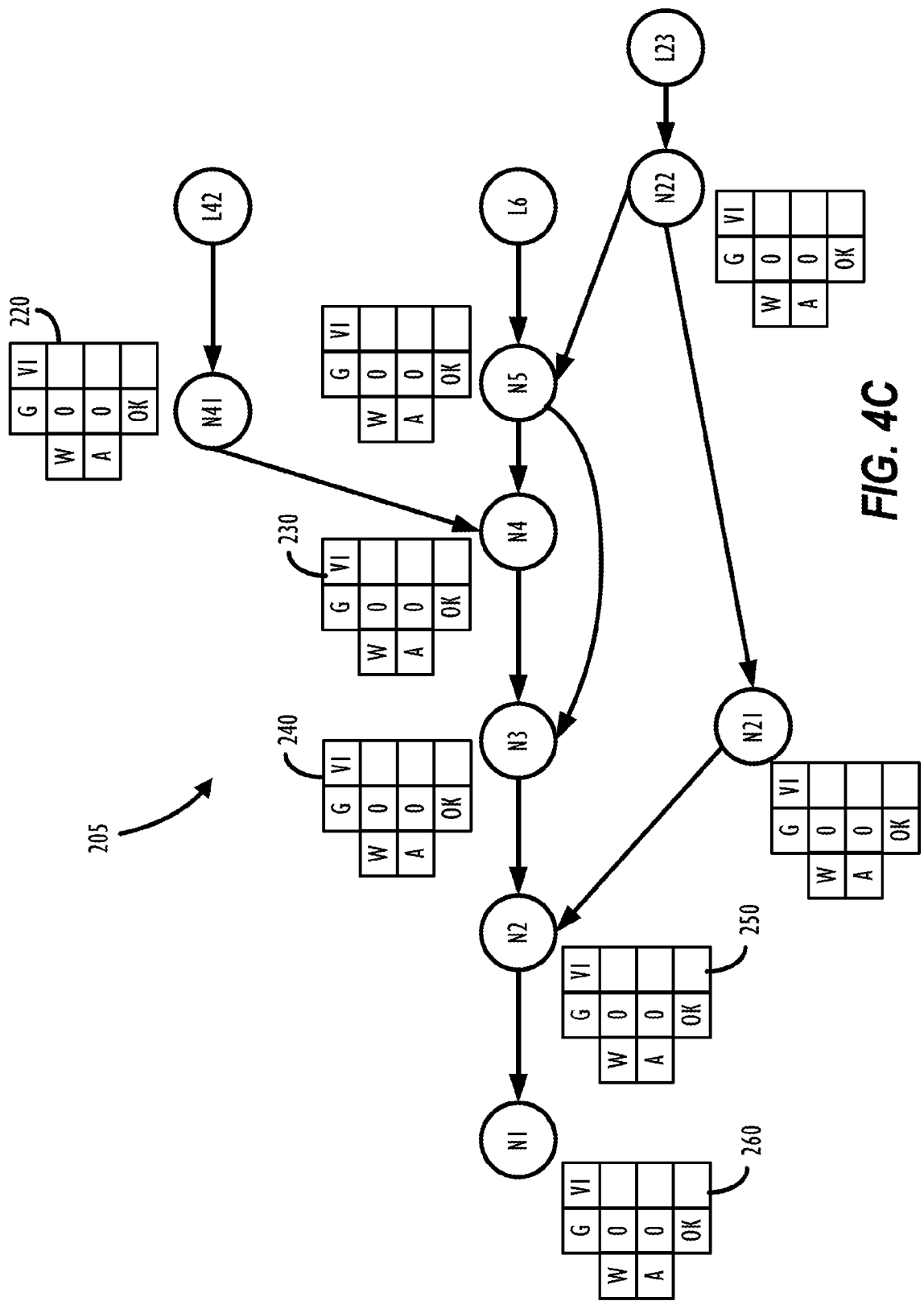

Now that propagation of a state has been discussed, the next example in FIGS. 4A-4C shows how a state is cleared throughout graph 205. In this example, state of leaf node L42 changes from WARNING to OK. Expected behavior for clearing state through graph 205 would be that graph 205 returns to its initial state before the previous state change was propagated. Clearing the state starts with a work list that contains the following task list on depth 5 of FIG. 2:

depth 5: L42→set_state("OK")

When the task list on depth 5 is executed, state of leaf node L42 is changed from WARNING to OK as shown in FIG. 4A. This causes WARNING count on node N41 to be decremented and forces a refresh of that node N41. After this task list is completed, it is removed from the work list so that the work list will resemble:

depth 4: N41→refresh

For the next step, node N41 first calculates its global view state. Because reference count of WARNING is now zero as shown table 220 in FIG. 4A, state of node N41 changes from WARNING to OK. Node N41 updates node N4's global view reference count in table 230. Node N41 then checks if there were view restrictions, and it finds restricted view V1. This means that node N41 has to "undo" the reference count changes it previously made on node N4 for view V1. Accordingly, the restricted view V1's reference count for WARNING in table 220 for node N41 is incremented, bringing that count to 0. Because node N41 updated reference counts in table 230 of node N4, a refresh of node N4 is added to the task list for depth 3 so that node N4 in turn re-calculate its states. The work list now resembles:

depth 3: N4→refresh

After executing the work list on depth 4, the state of the graph 3A will resemble FIG. 4A.

The next task to process is to refresh node N4. First, node N4 calculates global view state. This triggers a state change from WARNING to OK so node N4 updates its parent node N3's reference count table 240 for the global view. Then node N4 calculates state in the restricted view V1 so that its reference table 230 reflects FIG. 4B. Because all reference counts for its restricted view V1 are 0, node N4 knows two things: (1) state of restricted view V1 is the same as the global state; and (2) there is no longer a need to keep view specific state tables because all reference counts are 0.

Because the propagated state of restricted view V1 is now the same as the global state, node N4 has to "undo" the changes it previously made on node N3. Because node N4 knows both old and new state for global view and restricted view V1, it can calculate that it needs to increment WARNING reference count for the specific state of node N3's restricted view in table 240. Then node N4 pushes the refresh task of node N3 on the task list, and the same routine repeats itself. At completion of the work list, the state of the graph will be the same as the original state shown in FIG. 4C. During processing, the state of each node 210 can readily be retrieved. If the current view is the global view, then the global states of each node is read. When retrieving node states for a restricted view V1, a first check is made to see if there is a view specific state defined for restricted view V1. If there is, the state in the view specific column of the state table will contain the actual view state. If there is no view specific state, the global state will contain the correct state for the view.

Algorithm for View Specific Reference Count Updates

As noted above, a node can calculate reference count updates for a specific view based on old and new state of both global and specific views. Two points should be considered for this calculation. Firstly, if view state is the same as global state, a node will only propagate global state and there would be no adjustment needed on the parent node to get view state. Secondly, it is known that there was a previous adjustment if old global state and old view state were different. Therefore, in cases where old state is different but new state is unchanged, then the node has to "undo" the previous change as the state has reverted to what it was originally.

Referring now to FIG. 5A, a state table 500 is shown for which a node has been instructed to refresh. From the un-refreshed state table 500, the following information is known: (a) old state of the global view G is WARNING; and (2) old state of the restricted view V1 is OK. Using view state propagation rules already described in previous sections, new states for this node are as follows: (1) new state for new global view G is ALARM (ref-count alarm>0); and (2) new state for restricted view V1 is ALARM (ref-count alarm global+ref-count alarm V1>0).

Because the old global state was different than the old restricted view state, it is know that an adjustment has been made on the parent node(s) of this node. Because the old global state is WARNING, it is also known that the adjustment that was made was to decrement warning ref-count for restricted view V1 (and increment OK ref-count, if that is kept on parent nodes). Therefore, to undo this previous change, warning ref-count for V1 has to be incremented, and the OK ref-count (if that is kept) of parent node(s) has to be decremented.

Because the new states are the same, no more changes to the state of the restricted view in table of the node's parents is required. Global view propagation has already adjusted reference counts in the global view table. Pseudo-code shown in FIG. 5B describes this process.

Illustrative Example of Terminating Restricted View Propagation

Figure 6A:
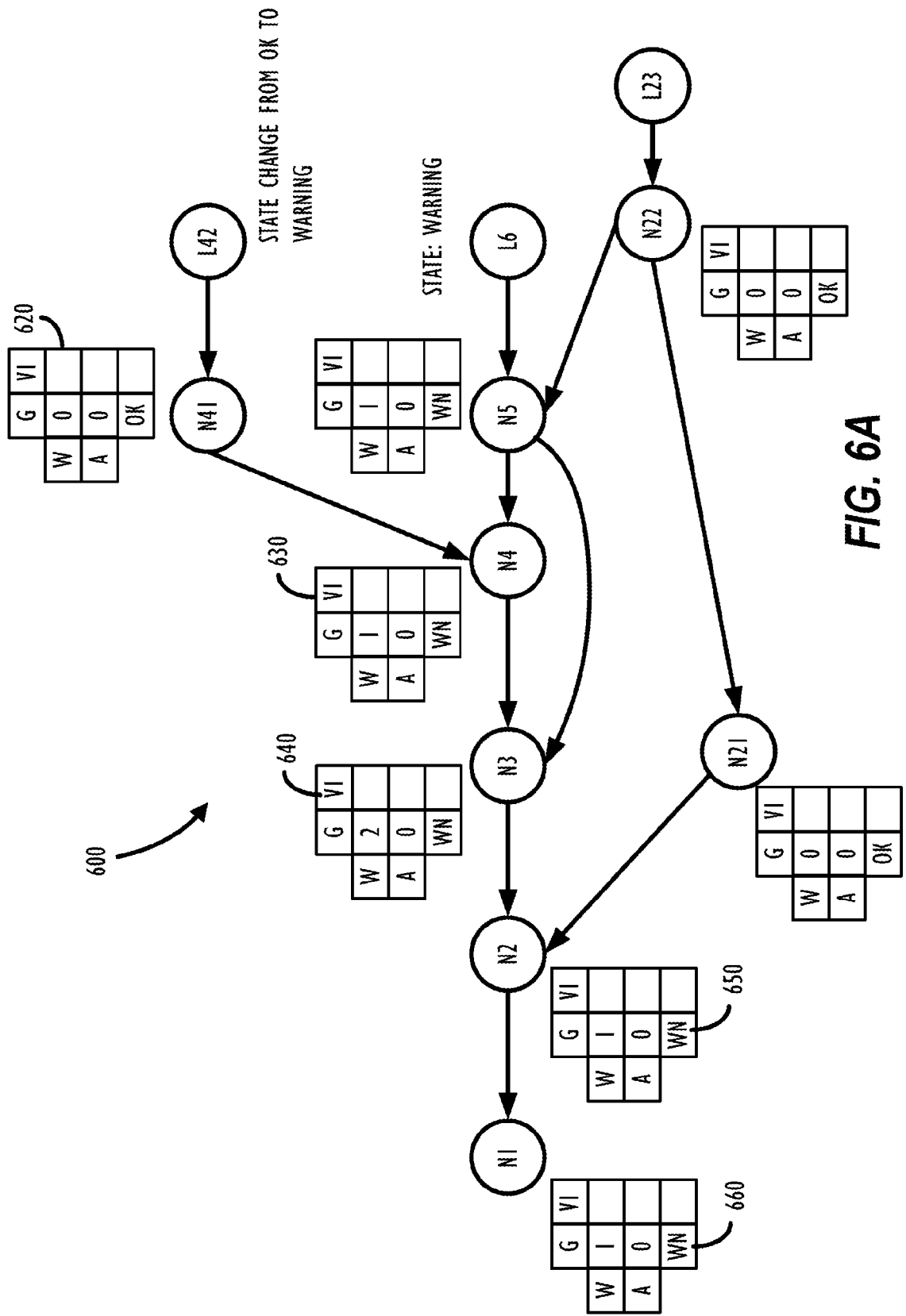
FIG. 6A-6C illustrate stages of a directed acyclic graph when state propagation is terminated.
Figure 6B:
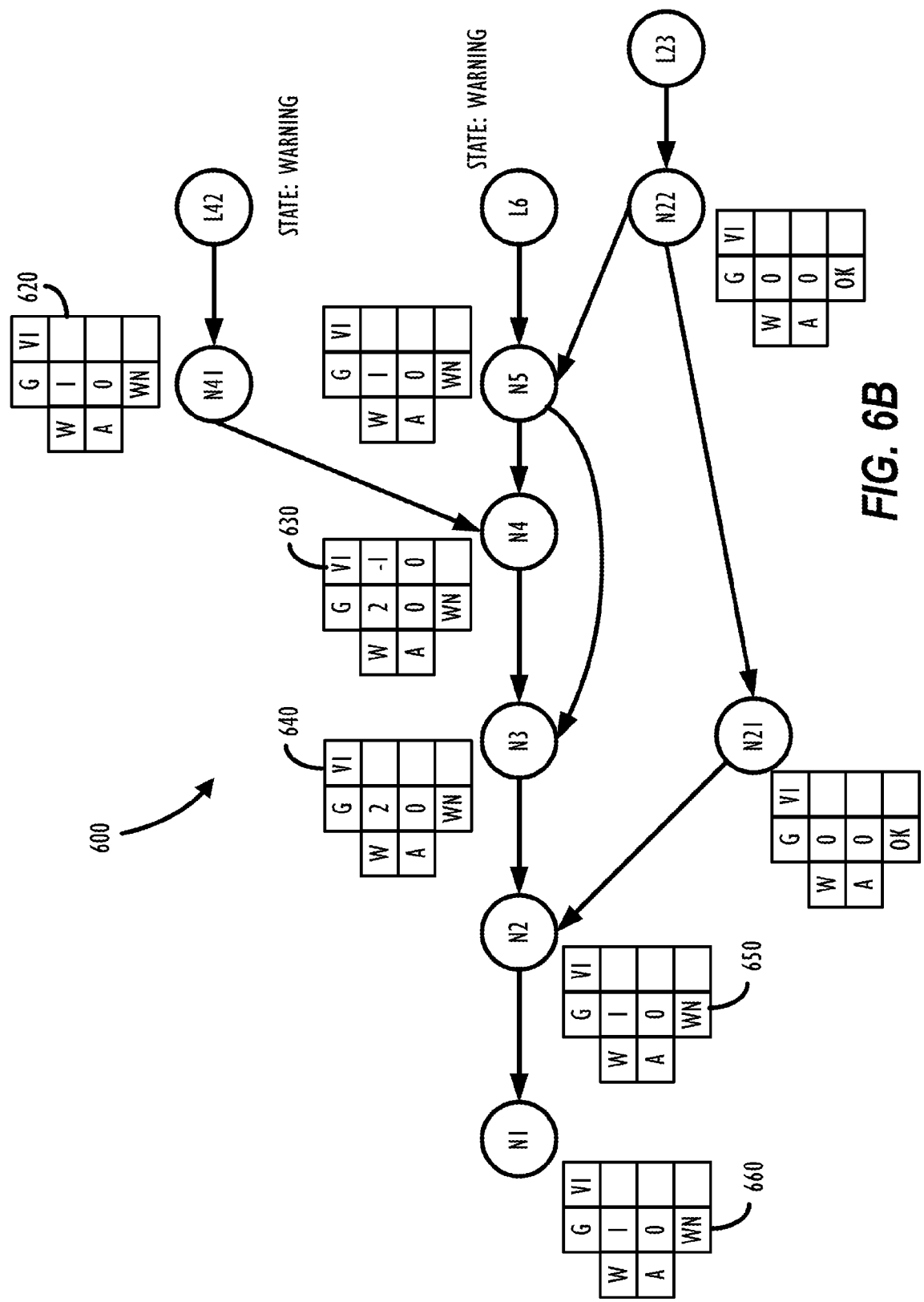
Figure 6C:
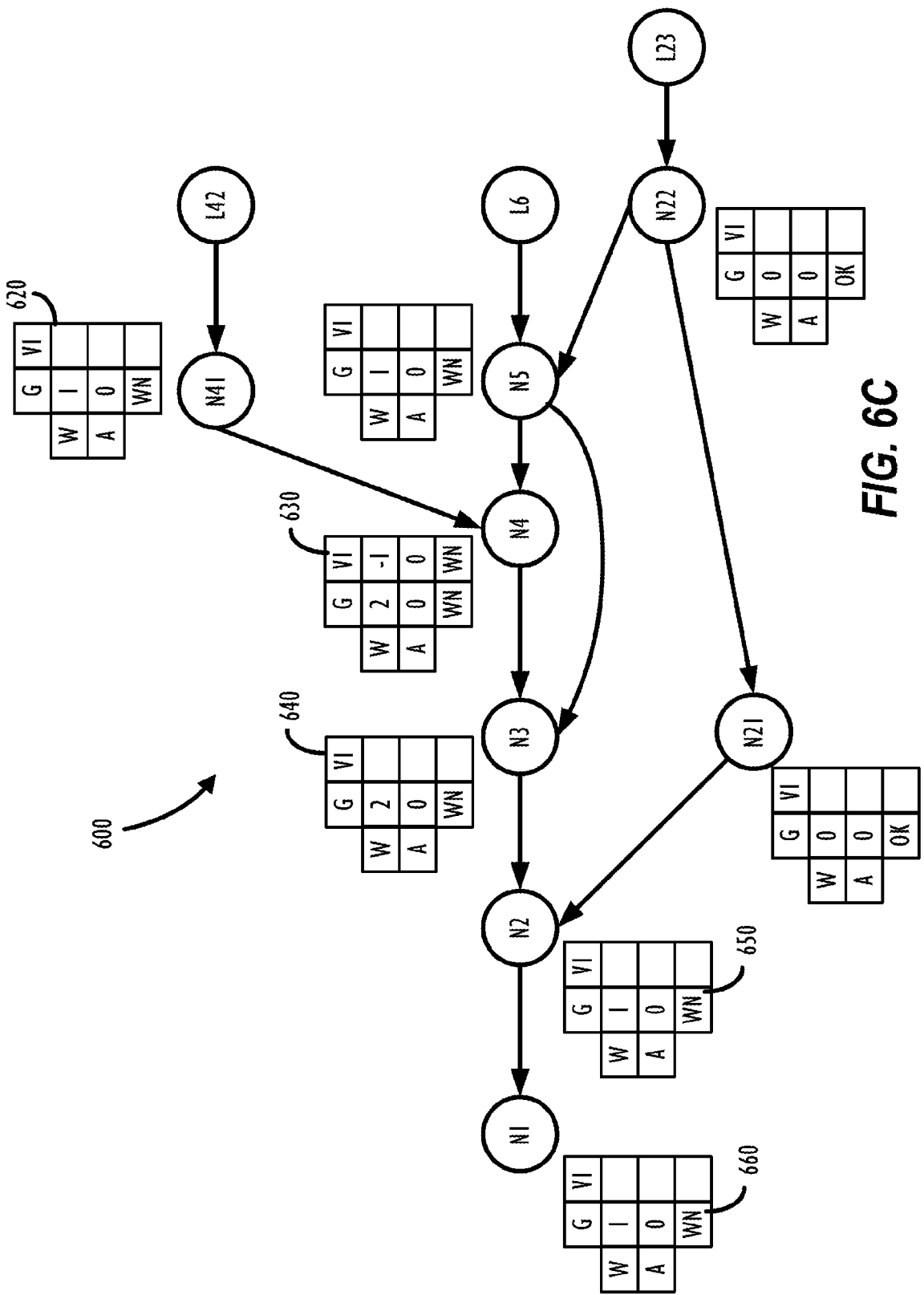

In some circumstance, propagation of a restricted view in the graph can be terminated. For example, graph 600 in FIG. 6A has leaf node L6 set in WARNING state, and this state change has been fully propagated through graph 600 in FIG. 6A. If the state of another leaf node L42 changes to WARNING, then setting node L42 to WARNING triggers a refresh of parent node N41. After propagation of states on node N41, the graph 600 resembles the state shown in FIG. 6B. After node N4 calculates what its new state will be, it is apparent that the state for both restricted view V1 and global view G are WARNING. Since both statuses are the same, node N4 does not have to adjust the view specific state on node N3. Because node N4's propagated state has not changed, further propagation is terminated, and node N4 does not trigger a refresh on node N3. The propagation is now complete, and the final state of the graph 600 is shown in FIG. 6C.

CONCLUSION

This disclosure describes a process for propagating impact of state changes through a directed acyclic graph that is efficient in terms of both CPU and memory usage. Use of state propagation in directed acyclic graphs in this disclosure is by way of example only, and is not intended as a limitation of the inventive concepts. In light of the present disclosure, it will be appreciated that propagation is not limited to state propagation and is equally applicable to any impact propagation scheme. Inventive concepts in this disclosure have the following additional benefits: (1) terminating propagations in a directed acyclic graph with multiple view overlays; (2) updating all views in a single pass; and (3) requiring additional memory only for restricted views having a state different than the state of the global view (evaluated on a per node basis).

Various changes in the number of states tracked, as well as in the details of the illustrated operational methods are possible without departing from the scope of the following claims. For example, even though the examples given are directed towards propagation of discrete states, the subject matter of the present disclosure is equally applicable to any situation where the output state of a node in a graph can be calculated using an arbitrary impact calculation function. For example, an impact calculation function could be defined that computes the percentage availability for a node based on the percentage availability and relative weights of each of its child nodes. The decision to terminate propagation could in this case be based on a defined tolerance. For example, if the percentage availability calculated by the function has not changed by more than 1% then a child will not propagate the change to its parents. Furthermore, the illustrative impact propagation can perform the identified propagation steps in an order different from that disclosed here. Alternatively, some embodiments can combine the activities described herein as being separate steps. Similarly, one or more of the described steps may be omitted, depending upon the specific operational environment in which the propagation is being implemented.

Acts in accordance with the impact propagation of this disclosure may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The preceding description is presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

What is claimed is:

1. A service model impact propagation method, comprising:
    creating, by a programmable control device, a data structure of a service impact model, the data structure having nodes representing components of the service impact model and having impact relationships between at least some of the nodes;
    associating, by a programmable control device, at least two views with a first of the nodes, the at least two views having different access to node information;
    associating, by a programmable control device, a first count with a first of the at least two views, the first count tracking at least one state for those nodes associated with the first view having impact relationships with the first node;
    associating, by a programmable control device, a second count with a second of the at least two views, the second count tracking the at least one state for those nodes associated with the second view having impact relationships with the first node;
    receiving, by a programmable control device, a request for information about the first node, the request associated with one of the first or second views; and
    returning, by a programmable control device, in response to the request, a resultant state of the first node derived from the first and second counts based on the associated view of the request.

2. The method of claim 1, wherein the data structure comprises a directed acyclic graph having the nodes for the components and having directed edges for the impact relationships.

3. The method of claim 1, wherein associating the at least two views with the first node comprises dynamically allocating storage for the at least two views when needed.

4. The method of claim 1, wherein associating the first view with the first node comprises associating a global view with the first node, the global view permitting access to node information of all of the nodes.

5. The method of claim 4, wherein associating the second view with the first node comprises associating a restricted view with the nodes, the restricted view restricting access to node information of at least some of the nodes.

6. The method of claim 1, wherein the at least one state is selected from the group consisting of
    at least one of a warning status, an alarm status, and an OK status for the components represented by the nodes;
    at least one range of percentage availability for the components represented by the nodes; and
    at least one range of throughput levels for the components represented by the nodes.

7. The method of claim 1, wherein returning the resultant state associated with the first view comprises deriving the resultant state for the first node from the first count for the at least one state.

8. The method of claim 1, wherein the second count offsets the first count for those nodes in the first count associated with the second view.

9. The method of claim 1, wherein returning the resultant associated with the second view comprises deriving the resultant state for the first node by offsetting the first count with the second count for the at least one state.

10. The method of claim 1, further comprising:
    changing, by a programmable control device, the at least one state of one of the nodes; and
    propagating, by a programmable control device, impact of the change to the at least two views of the nodes having impact relationships with the changed node.

11. The method of claim 10, wherein propagating impact of the change terminates along the impact relationships at a given one of the nodes when the at least one state determined for the given node remains unchanged.

12. The method of claim 10, wherein propagating impact of the change to the at least two views comprises modifying the first and second counts for the first node based on the impact relationships with the nodes affected by the change and based on the at least two views associated with the affected nodes.

13. A program storage device, readable by a programmable control device, comprising instructions stored on the program storage device for causing the programmable control device to implement the method of claim 1.

14. A service model impact propagation method, comprising:
    creating, by a programmable control device, a directed acyclic graph having nodes and directed edges, the nodes representing components of a service impact model, the directed edges representing impact relationships between at least some the components, each of the nodes having one of at least two states;
    associating, by a programmable control device, a plurality of views with the nodes, each of the views tracking counts of the at least two states of the nodes based on impact relationships with others of the nodes associated with the view;
    receiving, by a programmable control device, a request for information about a given one of the nodes, the request associated with one of the views; and
    returning, by a programmable control device, in response to the request, a resultant state of the given node, the resultant state derived from the counts for the at least two states associated with the view of the request.

15. The method of claim 14, wherein associating the views with the nodes comprises associating a first view with a given one of the nodes, the first view having a first count tracking the states for those nodes associated with the first view having impact relationships with the given node.

16. The method of claim 15, wherein the first view comprises a global view permitting access to node information of all of the nodes.

17. The method of claim 15, wherein associating the views comprises associating a second view with the given node, the second view having a second count tracking the states for those nodes associated with the second view having impact relationships with the given node.

18. The method of claim 17, wherein the second view comprises a restricted view restricting access to node information of at least some of the nodes.

19. The method of claim 14, further comprising:
    changing, by a programmable control device, at least one of the states of one of the nodes; and propagating, by a programmable control device, impact of the change to the views of the nodes having impact relationships with the changed node.

20. A program storage device, readable by a programmable control device, comprising instructions stored on the program storage device for causing the programmable control device to implement the method of claim 14.

* * * * *